(12) United States Patent
Bowers et al.

(10) Patent No.: US 10,171,615 B1
(45) Date of Patent: *Jan. 1, 2019

(54) SMART CACHE WARMING

(71) Applicant: Google Inc., Mountain View, CA (US)

(72) Inventors: Andrew Bowers, San Francisco, CA (US); Kevin Tom, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,226

(22) Filed: Oct. 31, 2016

Related U.S. Application Data

(63) Continuation of application No. 13/073,473, filed on Mar. 28, 2011, now Pat. No. 9,485,640.

(51) Int. Cl.
| | |
|---|---|
| *H04W 4/00* | (2018.01) |
| *H04L 29/08* | (2006.01) |
| *G06F 12/0862* | (2016.01) |
| *H04W 4/029* | (2018.01) |

(52) U.S. Cl.
CPC ...... *H04L 67/2847* (2013.01); *G06F 12/0862* (2013.01); *H04L 67/02* (2013.01); *H04L 67/22* (2013.01); *H04W 4/029* (2018.02); *G06F 2212/1021* (2013.01); *G06F 2212/1024* (2013.01); *G06F 2212/171* (2013.01); *G06F 2212/602* (2013.01); *G06F 2212/6024* (2013.01)

(58) Field of Classification Search
CPC .................. H04W 4/18; G06F 12/0862; G06F 2212/6024; G06F 2212/6026; G06F 2212/602; G06F 2212/1024; G06F 2212/171

See application file for complete search history.

(56) References Cited

U.S. PATENT DOCUMENTS

| | | | |
|---|---|---|---|
| 5,946,682 | A | 8/1999 | Wolfe et al. |
| 6,085,226 | A | 7/2000 | Horvitz |
| 6,182,133 | B1 | 1/2001 | Horvitz |

(Continued)

OTHER PUBLICATIONS

Response to Non Final Office Action for U.S. Appl. No. 13/073,473, filed Jun. 10, 2016, 12 pages.

(Continued)

*Primary Examiner* — Mark A Giardino, Jr.
*Assistant Examiner* — Tasnima Matin
(74) *Attorney, Agent, or Firm* — Brake Hughes Bellermann LLP

(57) ABSTRACT

According to one general aspect, a method of preemptively caching data within a mobile device may include detecting that a triggering event has occurred. The method may also include, in response to the triggering event, automatically performing an action associated with the triggering event, wherein the action includes retrieving anticipated data from a remote device. The method may include caching at least part of the anticipated data within a memory of the mobile device. The method may include receiving a request, from a user, for requested data, wherein the requested data includes at least a portion of the anticipated data. The method may include fulfilling at least part of the request for the requested data by retrieving the anticipated data portion of the requested data from the memory of the mobile device.

29 Claims, 5 Drawing Sheets

(56) References Cited

U.S. PATENT DOCUMENTS

| | | | |
|---|---|---|---|
| 6,301,576 B1 | 10/2001 | Wolfe | |
| 6,385,641 B1 | 5/2002 | Jiang et al. | |
| 6,742,033 B1 * | 5/2004 | Smith | G06F 17/30902 |
| | | | 707/E17.12 |
| 7,103,594 B1 | 9/2006 | Wolfe | |
| 7,408,887 B2 | 8/2008 | Sengupta et al. | |
| 7,467,137 B1 | 12/2008 | Wolfe | |
| 7,840,911 B2 | 11/2010 | Milener et al. | |
| 8,295,820 B2 * | 10/2012 | Gottfried | H04L 29/1216 |
| | | | 455/412.1 |
| 8,433,512 B1 | 4/2013 | Lopatenko et al. | |
| 8,438,474 B1 | 5/2013 | Lloyd | |
| 8,589,069 B1 | 11/2013 | Lehman | |
| 8,620,579 B1 | 12/2013 | Upstill et al. | |
| 8,725,849 B1 | 5/2014 | Lloyd | |
| 8,812,651 B1 | 8/2014 | Eriksen et al. | |
| 9,485,640 B2 | 11/2016 | Bowers et al. | |
| 2004/0025068 A1 | 2/2004 | Gary et al. | |
| 2006/0129766 A1 * | 6/2006 | Cassia | G06F 17/30902 |
| | | | 711/137 |
| 2007/0067373 A1 | 3/2007 | Higgins et al. | |
| 2008/0301300 A1 | 12/2008 | Toub | |
| 2009/0006994 A1 | 1/2009 | Forstall et al. | |
| 2009/0036148 A1 * | 2/2009 | Yach | G06Q 10/109 |
| | | | 455/457 |
| 2009/0055595 A1 | 2/2009 | Gill et al. | |
| 2009/0203388 A1 * | 8/2009 | Karaoguz | H04W 4/02 |
| | | | 455/456.3 |
| 2010/0332586 A1 | 12/2010 | Jogand-Coulomb et al. | |
| 2011/0060808 A1 | 3/2011 | Martin et al. | |
| 2011/0288936 A1 * | 11/2011 | Cumming | G06Q 30/0261 |
| | | | 705/14.58 |
| 2012/0023226 A1 | 1/2012 | Petersen et al. | |
| 2013/0067170 A1 | 3/2013 | Lam | |
| 2013/0346704 A1 | 12/2013 | Burger et al. | |
| 2015/0208219 A1 | 7/2015 | Bowers et al. | |

OTHER PUBLICATIONS

Advisory Action for U.S. Appl. No. 13/073,473, dated Aug. 27, 2015, 4 Pages.
Final Office Action for U.S. Appl. No. 13/073,473, dated Mar. 27, 2015, 19 Pages.
Non Final Office Action for U.S. Appl. No. 13/073,473, dated May 27, 2014, 12 Pages.
Non Final Office Action for U.S. Appl. No. 13/073,473, dated Mar. 10, 2016, 13 Pages.
Notice of Allowance for U.S. Appl. No. 13/073,473, dated Jun. 30, 2016, 8 Pages.
Final Office Action Response for U.S. Appl. No. 13/073,473, filed Aug. 27, 2015, 14 pages.
Final Office Action Response for U.S. Appl. No. 13/073,473, filed Jul. 27, 2015, 11 pages.
Non-Final Office Action Response for U.S. Appl. No. 13/073,473, filed Nov. 26, 2014, 11 pages.
Gao, et al., "Proactive Power-Aware Cache Management for Mobile Computing Systems", IEEE, vol. 51, No. 6, Jun. 2002, pp. 608-621.
Ward, et al., "Enhanced Portable Navigation Device", Sep. 16, 2009, 15 pages.
Weber, "Mobile Map Browsers: Anticipated User Interaction for Data Pre-Fetching", Dec. 2010, 111 pages.

* cited by examiner

100

SMART CACHE WARMING

CROSS-REFERENCE TO RELATED APPLICATION

This application is a Continuation of, and claims priority to, U.S. patent application Ser. No. 13/073,473, filed on Mar. 28, 2011, entitled "SMART CACHE WARMING", the disclosure of which is incorporated by reference herein in its entirety.

TECHNICAL FIELD

This description relates to the retrieval of data, and more specifically to the caching of data in anticipation of a user's desire for the data.

BACKGROUND

Human beings tend to be creatures of habit. Sometimes people start their day by reading the same newspapers, drinking the morning cup of tea or coffee, checking their email and daily appointments, etc. Other daily routines or habits may occur, depending upon the person.

Electronic devices are traditionally reactive, as opposed to proactive. Traditionally an electronic device only performs an action after a user (e.g., a human being) has instructed the electronic device to take a certain action. As such, given a user's habits, the user frequently tells their electronic device to perform the same or substantially identical actions each day or weekday according to a schedule.

SUMMARY

According to one general aspect, a method of preemptively caching data within a mobile device may include detecting that a triggering event has occurred. The method may also include, in response to the triggering event, automatically performing an action associated with the triggering event, wherein the action includes retrieving anticipated data from a remote device. The method may include caching at least part of the anticipated data within a memory of the mobile device. The method may include receiving a request, from a user, for requested data, wherein the requested data includes at least a portion of the anticipated data. The method may include fulfilling at least part of the request for the requested data by retrieving the anticipated data portion of the requested data from the memory of the mobile device.

According to another general aspect, an apparatus may comprise an anticipated data pre-loader, a memory, and a processor. The anticipated data pre-loader may be configured to detect that a triggering event has occurred, and in response to the triggering event, automatically perform an action associated with the triggering event, wherein the action includes retrieving anticipated data from a remote device. The memory may be configured to cache at least part of the anticipated data. The processor may be configured to execute machine readable instructions which when executed cause the apparatus to receive a request, from a user, for requested data, wherein the requested data includes at least a portion of the anticipated data, and fulfill at least part of the request for the requested data by retrieving the anticipated data portion of the requested data from the memory.

According to another general aspect, a computer program product for preemptively retrieving information may exist. The computer program product may be tangibly embodied on a computer-readable medium and include executable code. When executed the code may be configured to cause a data processing apparatus to detect that a triggering event has occurred; in response to the triggering event, automatically perform an action associated with the triggering event, wherein the action includes retrieving anticipated data from a remote device; and cache at least part of the anticipated data within a memory of the apparatus. Further the code may be configured to cause the apparatus to receive a request, from a user, for requested data, wherein the requested data includes at least a portion of the anticipated data; and fulfill at least part of the request for the requested data by retrieving the anticipated data portion of the requested data from the memory of the apparatus.

The details of one or more implementations are set forth in the accompanying drawings and the description below. Other features will be apparent from the description and drawings, and from the claims.

A system and/or method for the retrieval of data, substantially as shown in and/or described in connection with at least one of the figures, as set forth more completely in the claims.

BRIEF DESCRIPTION OF THE DRAWINGS

Like reference symbols in the various drawings indicate like elements.

DETAILED DESCRIPTION

Figure 1:
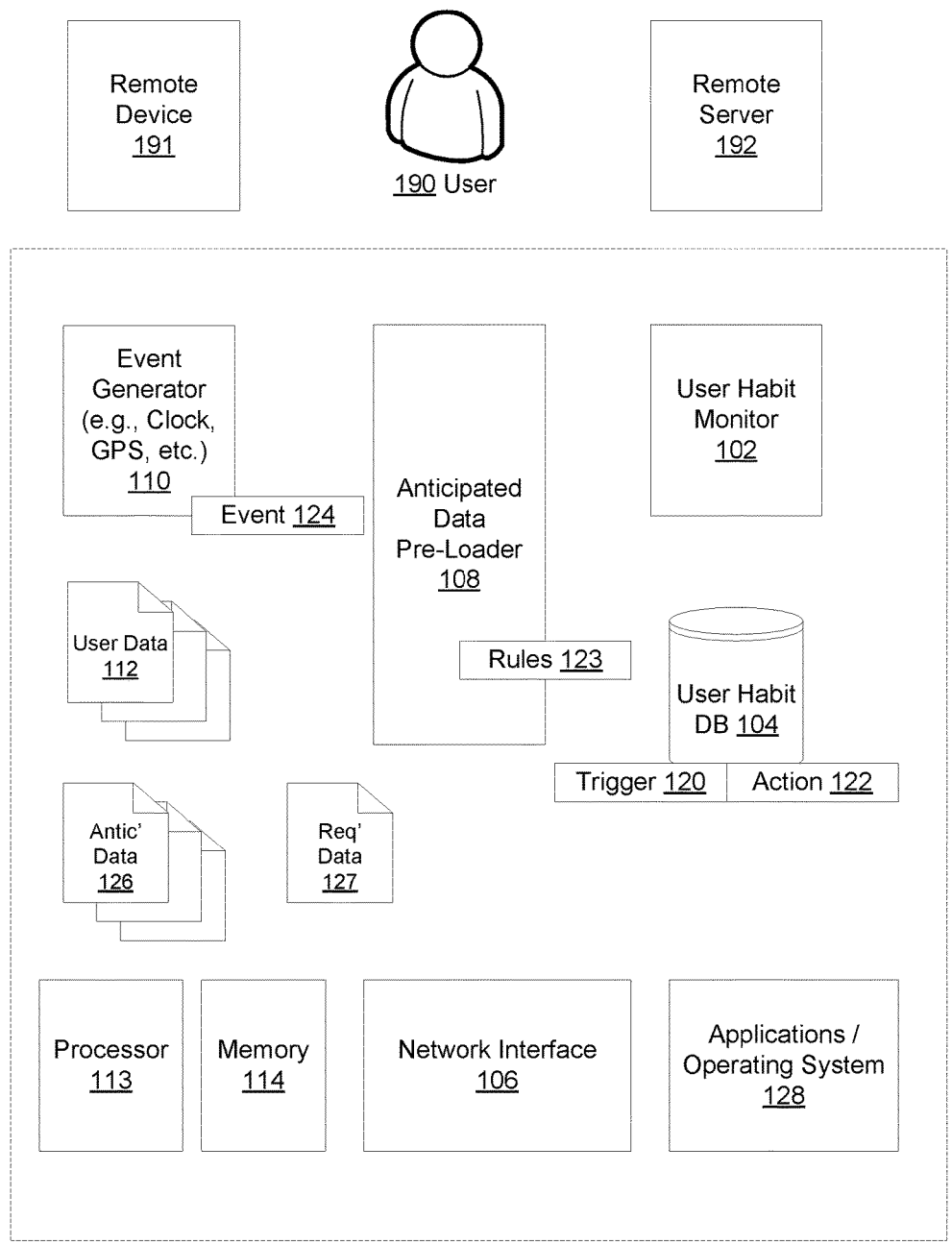
FIG. 1 is a block diagram of an example embodiment of a system in accordance with the disclosed subject matter.

FIG. 1 is a block diagram of an example embodiment of a system, mobile device, or electronic device 100 in accordance with the disclosed subject matter. In various embodiments, the device 100 may be frequently used by a user 190. In various embodiments, the system, mobile device, or electronic device 100 may include a processor 114, a memory 114, and a network interface 106.

The device 100 may include a user habit monitor 102 configured to monitor how the user 190 uses the device 100 and determine usage patterns or habits of the user 190. In various embodiments, the user habit monitor 102 may be configured to monitor the usage patterns of a plurality of users and determine user habits for each corresponding user. The user habit monitor 102 is described in more detail in reference to FIG. 3.

In one embodiment, the user habit monitor 102 may be configured to generate, modify or delete triggering events and actions. In such an embodiment, each trigger event may be associated with one or more actions, for example, as a paired set of values, etc. Each action may include one or more steps or operations that are to be performed automatically in response to the occurrence of the triggering event. The action may include the retrieval of anticipated data 126 from a remote device 191.

As such, the triggering event/action pair may provide a way for the device 100 to anticipate instances, based upon the user's habits or other predefined rules (e.g., a rule concerning a user's data 112, etc.), in which the user 190 is expected or predicted to request data. Based upon this prediction, the device 100 may anticipate that a user 190 is likely to request certain bits of information or data (e.g., a web page, calendar appointments, data files, maps, etc.). The device 100 may then preemptively and automatically retrieve those bits of anticipated data 126. The anticipated data 126 may then be cached or stored within the memory 114. As a result, when the user 190 actually requests the anticipated data 126 (e.g., goes to a web page, opens a file, etc.), the data 126 may be provided more quickly then if it had to be then retrieved from the remote device 191, and may even be available if the remote device 191 is unreachable (e.g., offline, on a different network, etc.).

The user habit monitor 102 may store the determined usage patterns or user habits within a user habit database (DB) or repository 104. In various embodiments, the user habit DB 104 may, in whole or part, be stored in a remote server 192. In such an embodiment, the user habit DB 104 may be synchronized across multiple devices, such as device 100.

The user habit DB 104 may store the user habits in a trigger-action pair scheme. In which the triggering event 120 details an event (e.g., time of day, calendar appointment, change in system resources, clock or timer expiration, etc.) that may occur. The action(s) 122 portion may detail an action or type of data which is normally requested by the user based upon the triggering event 120 (e.g., a web page, a map with directions, a document, etc.). The action 122 may detail the data which is anticipated to be desired by the user 190 in response to the triggering event 120 or a technique for acquiring the anticipated data (e.g., a Universal Resource Locator (URL), an if-then statement, a script, etc.). It is also contemplated that trigger/action pairs may be cascaded, in that a first action may generate a second triggering event 120 or select a second triggering event 120 from a plurality of possible triggering events, and so on, such that complex actions and habit definitions may be created.

Figure 3:
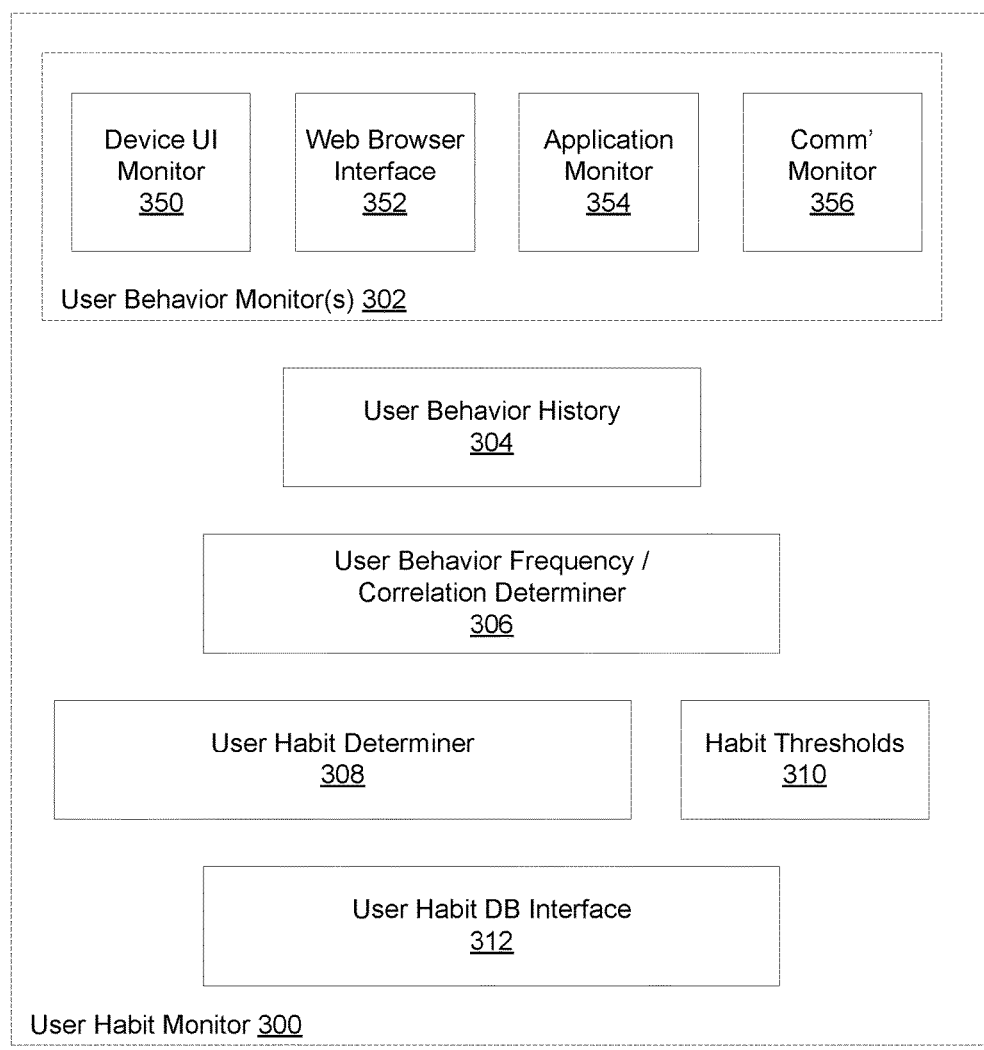
FIG. 3 is a block diagram of an example embodiment of an apparatus in accordance with the disclosed subject matter.

As described in more detail in regards to FIG. 3, the user habit monitor 102 may be configured to determine or monitor manual actions performed by the user 190 and from that, at least in part, determine a preceding triggering event 120 that may be used to predict the user's actions. For example, in an illustrative embodiment, the user habit monitor 102 may determine that the user 190 accesses certain news web pages every day or on certain days at about 7:30 am (which may be when the user 190 rides the train to work, etc.). The user habit monitor 102 may then create a triggering event 120 at a certain time earlier than 7:30 am (e.g., 6:30 am) and an action to automatically retrieve the data of the often accessed web pages.

In various embodiments, the user habit monitor 102 may be configured to monitor explicit user actions (e.g., mouse clicks, key presses, etc.). In another embodiment, the user habit monitor 102 may be configured to monitor the explicit results of consequences of a user action (e.g., an application being executed, a filename of a document being opened, etc.). In yet another embodiment, the user habit monitor 102 may be configured to monitor more secondary effects of a user's actions (e.g., monitoring network traffic to determine web sites accessed, etc.). It is understood that the above are merely a few illustrative examples to which the disclosed subject matter is not limited.

The triggering event time (e.g., 6:30 am) may be selected based on a predefined rule or other factors. Generally, the triggering event may occur sufficiently prior to the user's habitual manual request of the data that the anticipated data may be preemptively cached before the user's manual request. Such other factors may include, for example, when the device 100 switches from a Wi-Fi or wireless local area network (WLAN) to a cellular or metropolitan area network (MAN), the rate of change of the anticipated data, for example, stock data may be updated more often than news data, etc. In another embodiment, the triggering event may occur at a time when the device 100 is not expected to otherwise be used. It is understood that the above are merely a few illustrative examples to which the disclosed subject matter is not limited.

In another embodiment, the triggering event 120 may include a predicted substantial reduction in the device's 100 system resources. For example, the user habit monitor 102 may have determined that the user 190 un-plugs the device 100 at a given time (e.g., about 7:00 am, etc.), and thereafter the device 100 is powered by its battery (not shown). The user habit monitor 102 may create a triggering event 120 based upon this predicted reduction in system resources, and the associated action 122 may include performing a number of power intensive actions (e.g., trans-coding a video, synchronizing multimedia playlists, performing network actions, etc.) or other actions. Likewise other system resource related triggers (e.g., switching networks, storage space, etc.) may be considered and other actions may be performed; it is understood that the above are merely a few illustrative examples to which the disclosed subject matter is not limited.

In yet another embodiment, the triggering event 120 may include a location or a change in location of the device 100. For example, if the device 100 detects that it is within a certain location (e.g., the user's office, etc.), the associated action 122 may instruct that office-related anticipated data 126 (e.g., calendar appointments, email, files, etc.) be retrieved. In another example, if the device 100 detects that it is in an airport, the associated action 122 may include that the user's data 112 be searched for travel itineraries and relevant data (e.g., maps, email, travel guides, etc.) may be retrieved as anticipated data 126. It is understood that the above are merely a few illustrative examples to which the disclosed subject matter is not limited.

The device 100 may include an anticipated data pre-loader 108 configured to, in one embodiment, acquire or retrieve the anticipated data and store or cache the anticipated data in a memory 114. The anticipated data pre-loader 108 may periodically check or be notified that an event 124 or a triggering event 120 has occurred. For example, these events 124 may be generated by an event generator 110, which may include a clock, a location or motion sensor (e.g., Global Position System (GPS) sensor, altimeter, accelerometer, etc.), an application 128 (e.g., email arrival, calendar appointment, task, etc.), etc. In various embodiments, the anticipated data pre-loader 108 may subscribe to one or more event generators 110 based upon expected triggering events. In another embodiment, the anticipated data pre-loader 108 may receive notification of many events 124 from predefined sources. In yet another embodiment, the anticipated data pre-loader 108 may actively poll or request information from the event generators 110. In some embodiments, a mixture of the above may occur.

In one embodiment, the anticipated data pre-loader 108 may then check or determine if the received event 124 matches or fulfills a triggering event 120 stored within the user habit DB 104. If so, the anticipated data pre-loader 108 then attempt to perform the dictated or associated action 122.

The associated action 122 may include acquiring anticipated data 126, as described above. In one embodiment, this anticipated data 126 may be acquired via a network interface 106. The anticipated data 126 may then be stored within the memory or cache 114. The anticipated data 126 may then accessed by the device 100 or an application 128 executing or displayed by the device 100, as described above.

In various embodiments, the anticipated data pre-loader 108 may retrieve only part of the anticipated data 126 dictated by the action 122. For example, a general space or caching size limitation may conflict with the action 122 or a more general guiding rule 123 regarding the retrieval or storage of anticipated data 126 may cause the steps dictated by the action 122 to be modified by the anticipated data pre-loader 108. Other illustrative examples of guiding rules 123 may include the retrieval of all the anticipated data 126 but merely the storage or caching of only part of the retrieved anticipated data 126, the usage of a predefined username and password or other credentials to retrieve the anticipated data 126, restrictions regarding system resources (e.g., battery level, memory usage, LAN restrictions, data usage limitations, cost of bandwidth, cellular minute/data usage, etc.), encryption of anticipated data 126 from certain sources or types, etc.; it is understood that the above are merely a few illustrative examples to which the disclosed subject matter is not limited. For example, in a specific embodiment, the anticipated data loader 108 may not retrieve or, in another embodiment, save or cache anticipated data associated with dynamically changing information (e.g., stock market data, traffic conditions, etc.), an advertisement, a particular browser plug-in (e.g., Flash, SilverLight, etc.), or streaming media, etc.

In various embodiments, the device 100 may include user data 112 (e.g., digital certificates, presentation files, spreadsheets, project reports, documents, task lists, calendar appointments, etc.). In some embodiments, the action(s) 122 may instruct the anticipated data pre-loader 108 to utilize or retrieve these user data 112 to determine what data should be anticipated or the user data 112 actually include the anticipated data 126. As such, the user data 112 may include location information, hyperlinks, metadata or tag information, etc. which may be evaluated within the context of resolving an action 122 and the determination of anticipated data 126. If anticipated data 126 includes user data 112 which is locally stored (as opposed to being remotely available on a remote device, for example), that anticipated data 126 portion may, in one embodiment, not be re-stored within the memory 114 but instead remain stored using whatever scheme the user data 112 currently uses. Likewise, the event generator 110 may access user data 112 to determine if an event should be generated (e.g., a 15 minute warning before a calendar appointment, etc.).

In such an embodiment, a triggering event 120 may occur if any calendar appointments (part of the user data 112 or retrieved as part of a previous action 122, etc.) occur during the current day. The associated action 122 may instruct the anticipated data pre-loader 108 to "look at" or "read" each calendar appointment. If the calendar appointment is associated with any files (e.g., documents, presentations, etc.), the action 122 may instruct the anticipated data pre-loader 108 to retrieve those files. In some embodiments, those files may be retrieved from a remote device 191, and cached in the memory 114 as anticipated data 126. In another embodiment, those associated files may already be stored within the device 100 as user data 112, in which case the anticipated data 126 stored in the memory 114 may merely be a pointer or other means of identifying or otherwise making retrievable the associated files within the user data 112.

In another embodiment, again the triggering event 120 may be a calendar appointment. In this embodiment, the action 122 may instruct the anticipated data pre-loader 108 to retrieve a map and/or travel directions to the location at which the calendar appointment will occur. The anticipated data pre-loader 108 may determine if the calendar appointment is associated with a location. The anticipated data pre-loader 108 may retrieve travel directions from, for example, the current location of the device 100, a predefined location (e.g., home, work, airport, etc.), wherein the predefined location may change based upon time of day or other factors, or the travel directions may be based upon a previous calendar appointment (e.g., a series of directions from one appointment to another), etc.; it is understood that the above are merely a few illustrative examples to which the disclosed subject matter is not limited.

Further, in one embodiment, the action 122 or the anticipated data pre-loader 108 may modify the user data 112 to include the retrieved anticipated data 126. For example, a calendar appointment may be modified to include the anticipated map and/or travel directions data. In another embodiment, the user data may be modified to include a link or a pointer to the retrieved anticipated data. It is understood that the above is merely one illustrative example to which the disclosed subject matter is not limited.

In one embodiment, the user 190 may manually request data (e.g., the user 190 may look at a web site as is their habit, etc.). In such an embodiment, the application or operating system 128, anticipated data pre-loader 108, or other component of device 100 may determine if the user's requested data 127 includes at least a portion of the cached anticipated data 126. If so, the device 100 may fulfill the request for that portion of the requested data 127 from or using the cached anticipated data 126.

Continuing the above example of the user 190 requesting data 127 by looking at their habitual web pages, the application or operating system 128 may determine that the requested data 127 from the web pages has already been cached as part of the anticipated data 126. Instead of using the network interface 106 to acquire the requested data 127, the application or operating system 128 may simply fulfill the request via the already cached anticipated data 126. In such an embodiment, system resources (e.g., power, network bandwidth, etc.) may be conserved or the request for the data may be fulfill more quickly, etc.

In various embodiments, the anticipated data 126 may be used to fulfill the request for data 127 even if the device 100 is offline or otherwise currently unable to retrieve the requested data from a remote device 191. In one embodiment, the cached anticipated data 126 may be used only if the requested data 127 may not be retrieved from a remote device 191 (e.g., as a stored and available but less preferred data source, etc.). In some embodiments, if the anticipated data 126 does not include the entirety of the requested data 127 (e.g., the advertisements included in the requested data 127 may not be cached, etc.), the device 100 may determine if the un-cached or un-anticipated data should be retrieved or can be retrieved from a remote device 191. If not, a predetermined placeholder data may be used instead to fulfill the request (e.g., a default icon badge or graphic, etc.).

Further, it is understood that not all of the anticipated data 126 may ever be requested by the user 190. The anticipated data 126 may include a set of data that the device 120 predicts a user 190 may request. There may be instances in which such a prediction or anticipation may be incorrect.

In such an embodiment, the device 120 may occasionally purge or remove incorrectly anticipated data 126 from the memory 114. In one embodiment, the anticipated data 126 may include or be associated with a "time to live" counter or other timing mechanism which causes the incorrectly anticipated data 126 to be purged if not used within a predefined period of time. In another embodiment, the amount of anticipated data space within the memory 114 may be limited and anticipated data 126 may be removed using a more traditional caching scheme (e.g., least recently used, etc.). In yet another embodiment, anticipated data 126 created by a first instance or execution of an action 122 or trigger/action pair may be replaced with anticipated data 126 created by a second or subsequent instance or execution of the same action 122, trigger/action pair, or a trigger/action pair tagged or in the same category as the first trigger/action pair. In one embodiment, cached anticipated data 126 may be synchronized across multiple devices in use by or associated with the user 190. It is understood that the above are merely a few illustrative examples to which the disclosed subject matter is not limited.

In various embodiments, the user habit monitor 102 may monitor the use of the anticipated data 126 and use such monitoring feedback to modify the triggering events 120 and/or actions 122 to better reflect the data the user 190 actually requests. Further, user habit monitor 102 may be configured to delete, modify or create triggering events 120 and/or actions 122 as the user's habits change.

Figure 2:
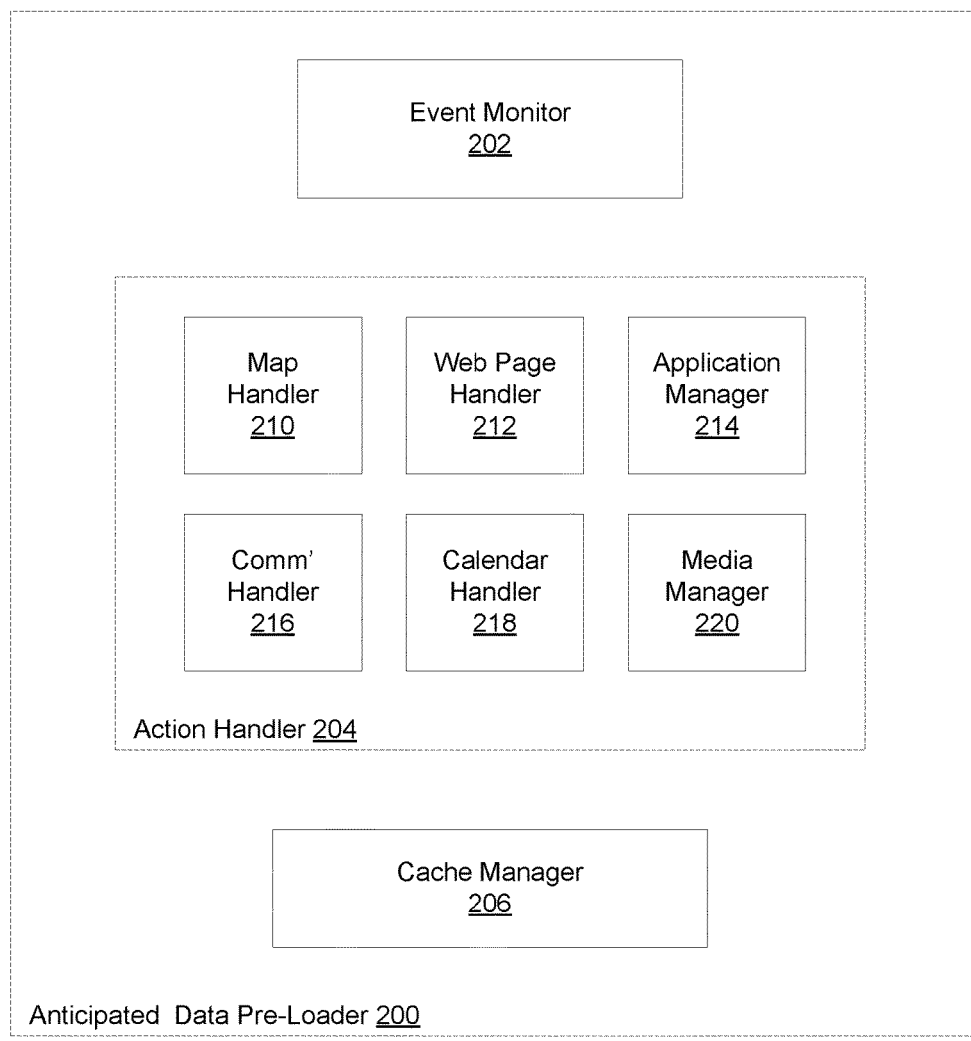
FIG. 2 is a block diagram of an example embodiment of an apparatus in accordance with the disclosed subject matter.

FIG. 2 is a block diagram of an example embodiment of an apparatus 200 in accordance with the disclosed subject matter. In various embodiments, the apparatus 200 may include the anticipated data pre-loader 200. In some embodiments, the anticipated data pre-loader 200 of FIG. 2 may be included in a larger system, such as, anticipated data pre-loader 108 of FIG. 1.

In one embodiment, the anticipated data pre-loader 200 may include an event monitor 202 configured to request or receive events or event notifications from an event generator (e.g., clock, location sensor, proximity sensor, application such as email program, calendar, etc.). In one embodiment, the event monitor 202 may be configured to determine if the received events match or correspond with any triggering events stored within a user habit DB.

In another embodiment, this determination may be made by an action handler 204, as described below. The anticipated data pre-loader 200 may include an action r handler 204 configured to determine if any triggers stored within a user habit DB are fulfilled by the received event notification.

In some embodiments, the action handler 204 may be further configured to determine the action associated with a realized or fulfilled triggering event. Further, the action handler 204 may be configured to determine, based upon the triggered action, what data is to be considered anticipated data.

The action handler 204 may be configured to retrieve the anticipated data and store the retrieved anticipated data in a memory or cache. In various embodiments, the anticipated data may be retrieved from a remote device, or in another embodiment, the anticipated data from locally stored user data, as described above. The anticipated data may be retrieved from a variety of sources and include a variety of types of data (e.g., files, maps, text, multimedia, etc.).

The action handler 204 may include a plurality of specialized action handlers. For example, in one embodiment, the action handler 204 may include a map handler 210 configured to determine and acquire anticipated data having to do with maps (e.g., pictures, directions, etc.). The action handler 204 may include a web page handler 212 configured to determine and acquire data having to do with web pages. The action handler 204 may include an application manager 214 configured to determine and acquire data having to do with applications (e.g., email applications, smartphone or micro-applications, social media applications, etc.). The action handler 204 may include a communications handler 216 configured to determine and acquire data having to do with communication (e.g., text or SMS (Short Message Service) messages, cellular or voice over internet protocol (VoIP) messages, voice mail, etc.). The action handler 204 may include a calendar handler 218 configured to determine and acquire data having to do with calendar appointments. The action handler 204 may include a media manager 220 configured to determine and acquire data having to do with documents or media (e.g., music, videos, etc.). Other event handlers are possible and contemplated. It is understood that the above are merely a few illustrative examples to which the disclosed subject matter is not limited.

In various embodiments, the various action handlers may inter-communicate. For example, in one illustrative embodiment, the calendar handler 218 may determine that a map, a few documents, and an email are included by the anticipated data. The calendar handler 218 may request the map information from the map handler 210, the documents from the media manger 220 or web page handler 212, and the email from the application manager 214. It is understood that the above is merely one illustrative example to which the disclosed subject matter is not limited.

The anticipated data pre-loader 200 may include a cache manager 206 configured, in one embodiment, to store the acquired or retrieved anticipated data within the cache or memory. The cache manager 206 may be configured to delete, compress, or re-format the anticipated data based upon a given set of rules (e.g., storage limitations, data age limitations, conflict rules, etc.). In various embodiments, the cache manager 206 may be configured to determine a first portion of the retrieved anticipated data to cache and a second portion of the retrieved anticipated data to delete or otherwise not cache (e.g., caching the news stories of a newspaper related anticipated data, but not the advertisements, etc.), as described above.

FIG. 3 is a block diagram of an example embodiment of an apparatus 300 in accordance with the disclosed subject matter. In various embodiments, the apparatus 300 may include user habit monitor 300. In some embodiments, the user habit monitor 300 of FIG. 3 may be included in a larger system, such as, user habit monitor 102 of FIG. 1.

The user habit monitor 300 may include one or more user behavior monitors 302 configured to monitor and record actions or behaviors performed by a user. In various embodiments, the user behavior monitor 302 may include a plurality of specialized user behavior monitors, each configured to monitor specific aspects of the user's interaction with the device or the user's behavior.

In one embodiment, the user behavior monitor 302 may include a device user interface (UI) monitor 350 configured to monitor actions or behaviors involving the device's user interface (e.g., on/off button, volume control, power plug, etc.). In various embodiments, the user behavior monitors 302 may include a web browser interface 352 configured to communicate and accesses user actions or behaviors with a web browser or other web using application (e.g., web history, bookmarks, cookies, etc.). The user behavior monitors 302 may include communications monitor 356 configured to monitor actions or behaviors involving communications performed by the device (e.g., phone calls, networking requests, text messages, etc.). It is understood that the above are merely a few illustrative examples to which the disclosed subject matter is not limited.

The user behavior monitors 302 may, in one embodiment, include an application monitor 354 configured to monitor actions or behaviors involving applications executed by the device (e.g., when an application is launched, what files are accessed by an application, etc.). Various applications may allow various levels of monitoring or integration. For example, in one embodiment, the application monitor 354 may not be able to tell what actions are performed by an application only when the application is executed and terminated. In another embodiment, the application monitor 354 may able to infer application usage from input/output (I/O) requests and file access. In yet another embodiment, the application monitor 354 may be tightly integrated with the monitored application(s) and be configured to "see" or monitor any actions performed by or requested of the application. In some embodiments, the application monitor 354 may include a mixture of these various levels of monitoring granularity depending upon the application monitored.

The user habit monitor 300 may include a user behavior history 304 configured to store a history (at least in part) of the user's actions or behaviors. In various embodiments, the user behavior history 304 may include a series of counters which arrogate or condense a plurality of actions or behaviors into a more manageable form. The user behavior history 304 may include an action taken or performed and an associated event which preceded the action (e.g., a time of day, the receipt of an email or communication, etc.).

The user habit monitor 300 may include a user behavior frequency or correlation determiner 306 configured to distil the user behavior history 304 information into a series of trigger/action pairs or other set of rules. The user behavior frequency or correlation determiner 306 may be configured to attempt to correlate user actions or behaviors and events using a number of schemes or possible relationships. These schemes or relationships may be user editable.

The user habit monitor 300 may include a user habit determiner 308 configured to determine which correlated events and actions occur with sufficient regularity or frequency to be regarded as a "user habit" or regularly repeated behavior pattern. The user habit determiner 308 may make use of a habit threshold 310 to determine which correlated user behaviors are to be considered user habits. In various embodiments, the level of the habit threshold 310 may be predefined. In another embodiment, the habit threshold 310 may be determined based upon a learning scheme (e.g., neural network, etc.).

The habit threshold 310 may include a frequency at which the user performs an action or a frequency at which anticipated data is actually used by a user (such that false positives are reduced) or other feedback schemes. A plurality of habit thresholds 310 may exist for various categories of actions (e.g., maps, web pages, documents, weekday actions, weekend actions, etc.).

The user habit monitor 300 may include a user habit DB interface 312 configured to store, create, modify, or delete indicators of user habits, such as, for example, trigger/action pairs within the user habit database or repository.

In various embodiments, the user habit DB interface 312 or the user habit determiner 308 may be configured to create, delete, or modify actions that include the retrieval of anticipated data and may be stored within the user habit DB. These storable actions may be based upon the results of the user behaviors which have been considered user habits.

In some embodiments, the user habit DB interface 312 or the user habit determiner 308 may be configured to determine one or more triggering events which resulted in the storable actions. The user habit DB interface 312 or the user habit determiner 308 may be configured to select one or more triggering events which preceded or occurred prior to the storable events and prior to the monitored user behaviors that occurred prior to the storable actions. The selection may be based, at least in part, upon the amount of correlation between the user's behavior and a one or candidate triggering events which occurred prior to the user's behavior.

As described above, one of the purposes of determining anticipated data is so that the device may pre-load or preemptively retrieve data before the user manually requests the data. Therefore, the user habit monitor 300 may be configured to determine or select a triggering event that will likely occur sufficiently ahead of the user's manual request that the anticipated data (defined by the associated action) may be retrieved and ready to fulfill user's request when it occurs. It is understood that the above is merely one illustrative example to which the disclosed subject matter is not limited.

In such an embodiment, the determination of the triggering event may be based upon a set of predefined rules or considerations that are configured to create a triggering event sufficiently correlated, but prior to, the user's manual behavior that caused the requested data to be retrieved. For example, if the user requests a series of web pages everyday at about 7:30 am, the triggering event may be determined to be the occurrence of 7:00 am (such that the web page data is pre-loaded by 7:30 am when the user requests it). In a more complex example, the user habit monitor 300 may take into account other factors, such as the time the user being in the habit of unplugging the device at about 7:00 am, and adjust the trigger to occur at a more optimal time (e.g., 6:30 am) for the use of system resources (e.g., power, bandwidth, etc.). It is understood that the above are merely a few illustrative examples to which the disclosed subject matter is not limited.

Figure 4:
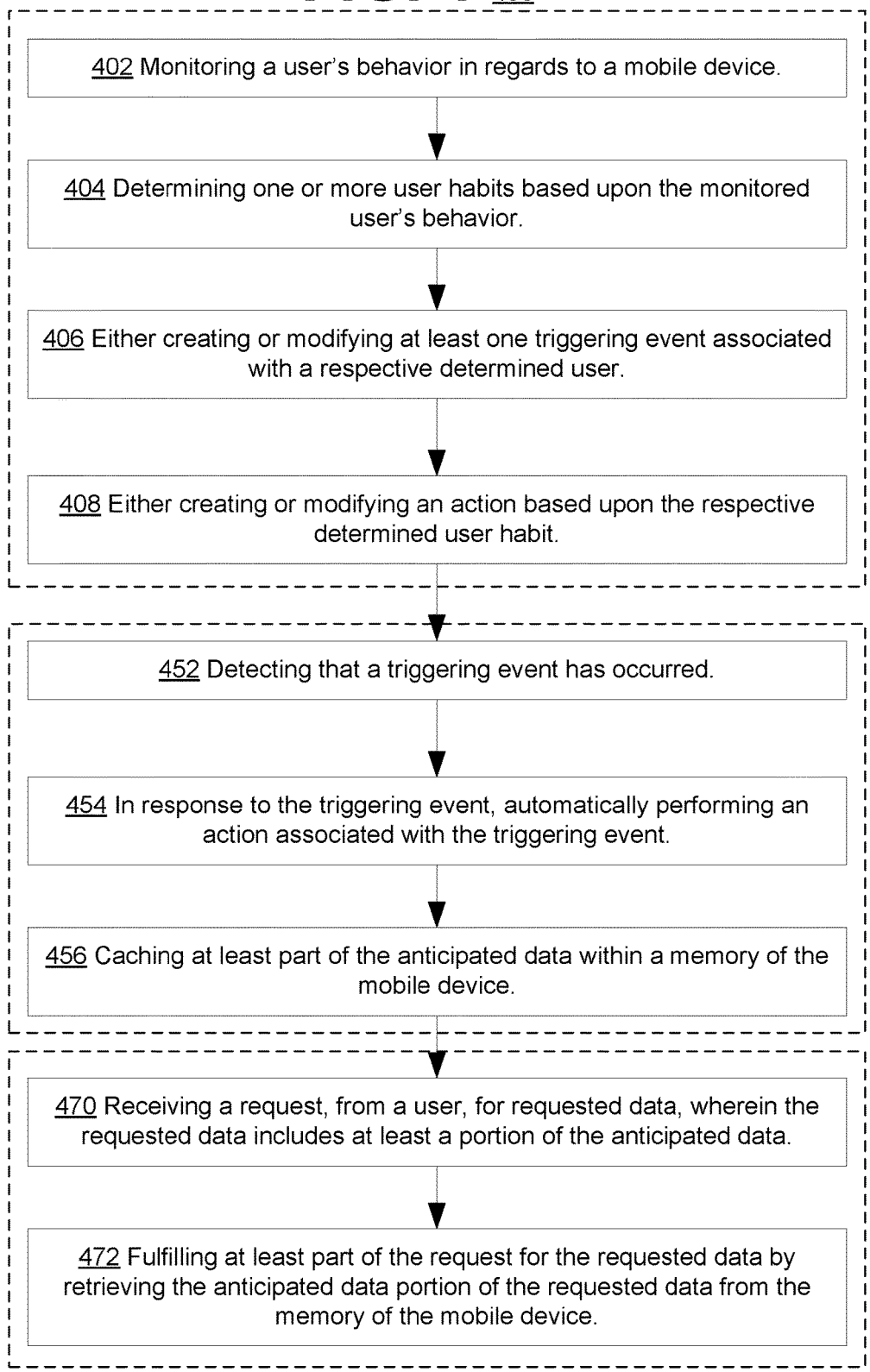
FIG. 4 is a flowchart of an example embodiment of a technique in accordance with the disclosed subject matter.

FIG. 4 is a flow chart of an example embodiment of a technique in accordance with the disclosed subject matter. In various embodiments, the technique 400 may be used or produced by the systems such as those of FIG. 1 or 5. Furthermore, portions of technique 400 may be used or produced by the apparatuses such as that of FIG. 2 or 3. It is understood that the above are merely a few illustrative examples to which the disclosed subject matter is not limited. It is understood that the disclosed subject matter is not limited to the ordering of or number of actions illustrated by technique 400.

Block 402 illustrates that, in one embodiment, a user's behavior in regards to an electronic or mobile device may be monitored, as described above. In various embodiments, one or more of the action(s) illustrated by this Block may be performed by the apparatuses or systems of FIG. 1, 3, or 5, the user habit monitor 102 of FIG. 1, or the user habit monitor 300 or user behavior monitor(s) 302 of FIG. 3, as described above.

Block 404 illustrates that, in one embodiment, one or more user habits may be determined based upon the monitored user's behavior, as described above. In various embodiments, determining a user habit may include determining the frequency of a user's behavior, as described above. Determining a user habit may also include correlating the user's behavior with one or more events that occur prior to the user's behavior, as described above. Further, determining a user habit may include determining if the user's behavior occurs above a threshold and if the user's behavior is correlated with the event sufficiently, based upon predefined criteria, to be determined to be a user habit, as described above. In various embodiments, one or more of the action(s) illustrated by this Block may be performed by the apparatuses or systems of FIG. 1, 3, or 5, the user habit monitor 102 of FIG. 1, or the user habit monitor 300 or user habit determiner 308 of FIG. 3, as described above.

Block 406 illustrates that, in one embodiment, at least one triggering event associated with a respective determined user may be created, modified or deleted, as described above. In various embodiments, determining the triggering event may include selecting, based upon the amount of correlation of the user's behavior of the determined user habit and the one or more events that occur prior to the user's behavior, one of the one or more events that occur prior to the user's behavior, as described above. In various embodiments, one or more of the action(s) illustrated by this Block may be performed by the apparatuses or systems of FIG. 1, 3, or 5, the user habit monitor 102 of FIG. 1, or the user habit monitor 300, user habit determiner 308, or user habit DB interface 312 of FIG. 3, as described above.

Block 408 illustrates that, in one embodiment, an action based upon the respective determined user habit may be created, edited, or deleted, as described above. In various embodiments, one or more of the action(s) illustrated by this Block may be performed by the apparatuses or systems of FIG. 1, 3, or 5, the user habit monitor 102 of FIG. 1, or the user habit monitor 300, user habit determiner 308, or user habit DB interface 312 of FIG. 3, as described above.

Block 452 illustrates that, in one embodiment, the electronic or mobile device may detect that a triggering event has occurred, as described above. In various embodiments, one or more of the action(s) illustrated by this Block may be performed by the apparatuses or systems of FIG. 1, 2, or 5, the anticipated data pre-loader 108 of FIG. 1, or the anticipated data pre-loader 200, the event monitor 202, or the event handler 204 of FIG. 2, as described above.

Block 454 illustrates that, in one embodiment, the electronic or mobile device may, in response to the triggering event, automatically perform an action associated with the triggering event, as described above. In some embodiments, the action may include the retrieval of anticipated data from a remote device, as described above. In various embodiments, one or more of the action(s) illustrated by this Block may be performed by the apparatuses or systems of FIG. 1, 2, or 5, the anticipated data pre-loader 108 of FIG. 1, or the anticipated data pre-loader 200 or the event handler 204 of FIG. 2, as described above.

In various embodiments, the triggering event may include the time of day and the action associated with the triggering event may include retrieving data from a plurality of news-related Internet sites, as described above. The action may also include determining at least a first portion of the retrieved data to cache as anticipated data, and a second portion of the retrieved data to not cache as anticipated data, as described above. In various embodiments, the first portion may include all of the retrieved data, in which case the second portion would not exist or be empty.

In another embodiment, the triggering event may include an upcoming calendar event, as described above. In one embodiment, the associated action may include retrieving travel directions from a first location to the location associated with the upcoming calendar appointment, as described above. In another embodiment, the associated action may include retrieving one or more files associated with the upcoming calendar appointment, as described above.

In yet another embodiment, the triggering event may include a predicted substantial reduction in the device's system resources, as described above. In such an embodiment, the associated action may include retrieving the anticipated data before the predicted substantial reduction in the device's system resources occurs, as described above.

In yet one more embodiment, the triggering event may include a change in the location of the device, as described above. In such an embodiment, the associated action may include retrieving anticipated data based upon the new location of the device (e.g., the user's office, etc.), as described above.

It is understood that the above are merely a few illustrative examples to which the disclosed subject matter is not limited.

Block 456 illustrates that, in one embodiment, at least part of the anticipated data may be stored or cached within a memory of the device, as described above. In various embodiments, one or more of the action(s) illustrated by this Block may be performed by the apparatuses or systems of FIG. 1, 2, or 5, the anticipated data pre-loader 108 or memory 114 of FIG. 1, or the anticipated data pre-loader 200 or the cache manager 206 of FIG. 2, as described above.

Block 470 illustrates that, in one embodiment, a request, from a user, for requested data may be received, as described above. In various embodiments, the requested data may include at least a portion of the anticipated data, as described above. In various embodiments, one or more of the action(s) illustrated by this Block may be performed by the apparatuses or systems of FIG. 1, 2, or 5, the anticipated data pre-loader 108 or application/operating system 128 of FIG. 1, as described above.

Block 472 illustrates that, in one embodiment, at least part of the request for the requested data may be fulfilled by retrieving the anticipated data portion of the requested data from the memory of the device, as described above. In various embodiments, one or more of the action(s) illustrated by this Block may be performed by the apparatuses or systems of FIG. 1, 2, or 5, the anticipated data pre-loader 108 or application/operating system 128 of FIG. 1, as described above.

Figure 5:
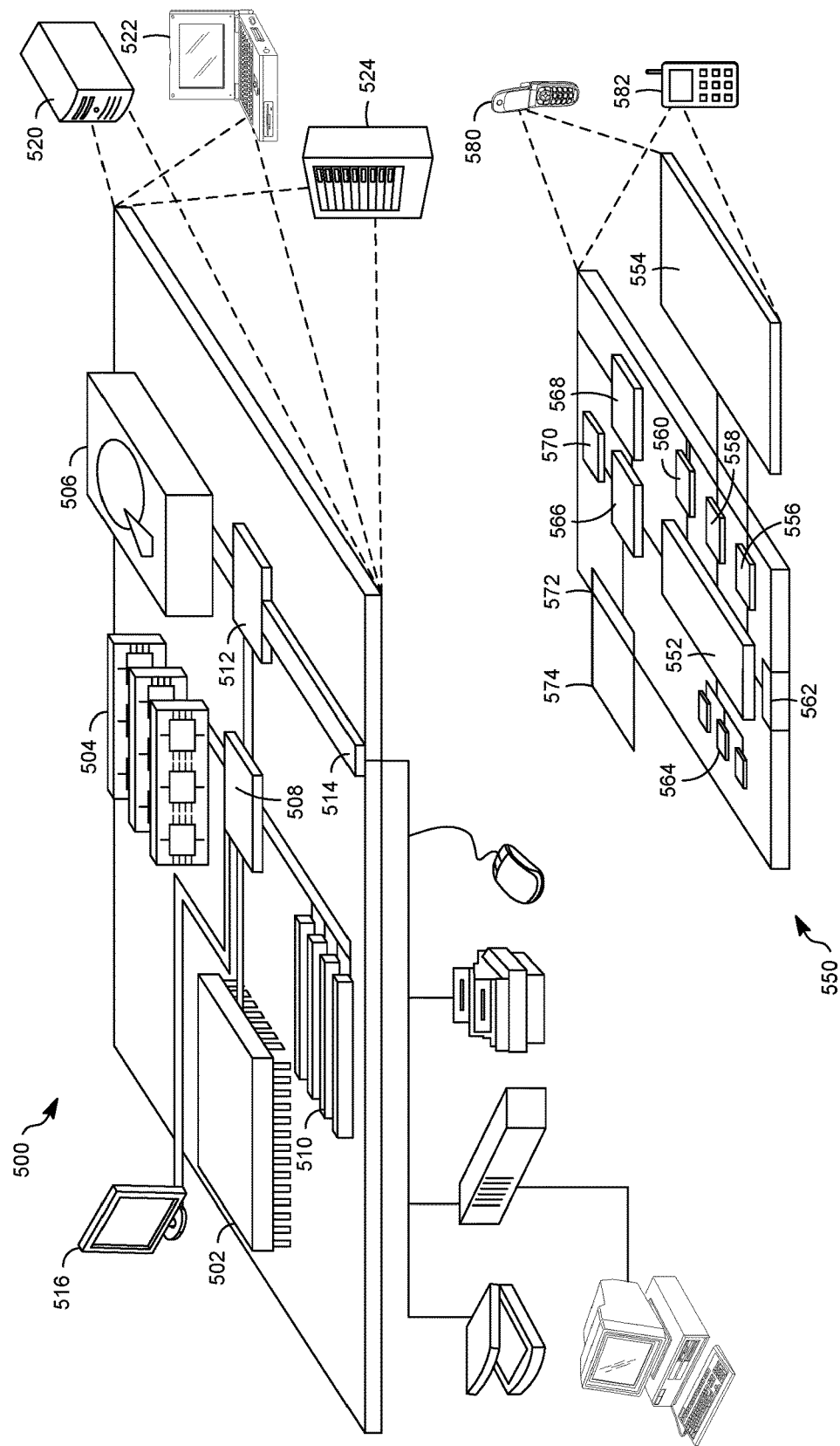
FIG. 5 is a block diagram of an example embodiment of a system in accordance with the disclosed subject matter.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a graphical user interface (GUI) on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system, etc.).

The memory 504 stores information within the computing device 500. In one implementation, the memory 504 includes a volatile memory unit or units. In another implementation, the memory 504 includes a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output (I/O) device such as a display 554, a communication interface 566, and a transceiver 568, among other components. The device 550 may also be provided with a storage device, such as a micro-drive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the disclosed subject matter.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method of preemptively caching data within a mobile device, the method comprising:

detecting a triggering event, wherein the triggering event includes a communication from a communication application, wherein the communication is related to upcoming travel;

in response to detecting the triggering event, automatically performing an action paired with the triggering event, wherein the action includes retrieving anticipated data from a remote device and the anticipated data includes travel-related information directly related to the upcoming travel including one or more travel guides;

caching at least a portion of the anticipated data within a memory of a mobile device;

receiving a request for requested data, wherein the requested data includes at least the portion of the anticipated data; and fulfilling at least part of the request for the requested data by retrieving at least the portion of the anticipated data directly from the memory of the mobile device such that at least part of the request for the requested data is fulfilled when the remote device is unavailable to fulfill the request.

2. The method as in claim 1, wherein the anticipated data further includes traveling directions directly related to the upcoming travel.

3. The method as in claim 1, wherein the anticipated data further includes maps directly related to the upcoming travel.

4. The method as in claim 1, wherein the anticipated data further includes travel directions from a first location to a second location.

5. The method as in claim 1, wherein the anticipated data further includes a travel itinerary.

6. A method of preemptively caching data within a mobile device, the method comprising:

monitoring a user's behavior based on interactions with a mobile device;

determining one or more user habits based upon the monitored user's behavior;

generating at least one triggering event associated with a respective determined user habit;

generating and pairing an action based upon the respective determined user habit by creating and storing a triggering event and action pair such that the action is associated with a respective triggering event;

detecting a triggering event, wherein the triggering event includes a predicted reduction in system resources of the mobile device and the predicted reduction in system resources includes a prediction of transitioning the mobile device to battery power;

in response to the triggering event, automatically performing the action paired with the triggering event using the stored triggering event and action pair, wherein the action includes retrieving anticipated data from a remote device before the predicted reduction in the system resources occurs;

caching at least a portion of the anticipated data within a memory of the mobile device;

receiving a request for requested data, wherein the requested data includes at least the portion of the anticipated data; and fulfilling at least part of the request for the requested data by retrieving at least the portion of the anticipated data from the memory of the mobile device.

7. The method as in claim 6, wherein:
the triggering event includes a time of day; and
the action paired with the triggering event includes:
retrieving data from a plurality of news-related Internet sites, and
determining at least a first portion of the retrieved data to cache as the portion of the anticipated data and a second portion of the retrieved data to not cache as the portion of the anticipated data.

8. The method as in claim 6, wherein caching at least the portion of the anticipated data comprises transmitting at least the portion of the anticipated data that is cached to a remote server, wherein the remote server is configured to synchronize at least the portion of the anticipated data across a plurality of devices.

9. The method as in claim 6, wherein:
the triggering event includes an upcoming calendar appointment, wherein the upcoming calendar appointment is associated with a location; and
the action paired with the triggering event includes retrieving traveling directions from a first location to the location associated with the upcoming calendar appointment.

10. The method as in claim 6, wherein:
the triggering event includes an upcoming calendar appointment, wherein the upcoming calendar appointment is associated with one or more files; and
the action paired with the triggering event includes retrieving at least one of the one or more of the files associated with the upcoming calendar appointment.

11. The method as in claim 6, wherein:
the triggering event includes a change in location of the mobile device; and
the action includes retrieving at least the portion of the anticipated data based upon a new location of the mobile device.

12. The method as in claim 6, wherein:
the triggering event includes a first time of day; and
generating the triggering event associated with the respective determined user habit includes modifying the triggering event to include a second time of day such that the action paired with triggering event consumes less system resources than if the action occurred at the first time of day.

13. The method as in claim 6, wherein the action includes one of trans-coding a video, synchronizing multimedia playlists, and performing a network action.

14. A mobile computing device comprising:
a user habit monitor configured to:
monitor a user's behavior based on interactions with a mobile computing device,
determine one or more user habits based upon the monitored user's behavior,
generate at least one triggering event associated with a respective determined user habit, and
generate and pair an action based upon the respective determined user habit by creating and storing a triggering event and action pair such that the action is associated with a respective triggering event;
an anticipated data pre-loader configured to:
detect a triggering event, wherein the triggering event includes a predicted reduction in system resources of the mobile computing device and the predicted reduction in system resources includes a prediction of transitioning the mobile computing device to battery power, and
in response to the triggering event, automatically perform the action paired with the triggering event using the stored triggering event and action pair, wherein the action includes retrieving anticipated data from a remote device before the predicted reduction in system resources occurs;
a memory configured to:
cache at least a portion of the anticipated data; and
a processor configured to execute machine readable instructions which when executed cause the mobile computing device to:
receive a request, from a user, for requested data, wherein the requested data includes at least the portion of the anticipated data, and
fulfill at least part of the request for the requested data by retrieving at least the portion of the anticipated data from the memory.

15. The mobile computing device of claim 14, wherein:
the triggering event includes a time of day; and
the action paired with the triggering event causes the mobile computing device to:
retrieve data from a plurality of news-related Internet sites, and
determine at least a first portion of the retrieved data to cache as the portion of the anticipated data and a second portion of the retrieved data to not cache as the portion of the anticipated data.

16. The mobile computing device of claim 14, wherein:
the anticipated data pre-loader is configured to transmit at least the portion of the anticipated data that is cached to a remote server, and
the remote server is configured to synchronize at least the portion of the anticipated data across a plurality of devices.

17. The mobile computing device of claim 14, wherein:
the triggering event includes an upcoming calendar appointment, wherein the upcoming calendar appointment is associated with a location; and
the action paired with the triggering event causes the mobile computing device to retrieve traveling directions from a first location to the location associated with the upcoming calendar appointment.

18. The mobile computing device of claim 14, wherein:
the triggering event includes an upcoming calendar appointment, wherein the upcoming calendar appointment is associated with one or more files; and
the action paired with the triggering event causes the mobile computing device to retrieve at least one of the one or more of the files associated with the upcoming calendar appointment.

19. The mobile computing device of claim 14, wherein:
the triggering event includes a change in location of the mobile computing device; and
the action causes the mobile computing device to retrieve at least the portion of the anticipated data based upon the new location of the mobile computing device.

20. The mobile computing device of claim 14, wherein:
the triggering event includes a first time of day; and
the user habit determiner is configured to modify the triggering event to include a second time of day such that the action paired with the triggering event consumes less system resources than if the action occurred at the first time of day.

21. The mobile computing device of claim 14, wherein the action includes one of trans-coding a video, synchronizing multimedia playlists, and performing a network action.

22. A computer program product for preemptively retrieving information, the computer program product being tangibly embodied on a non-transitory computer-readable storage medium and including executable code that, when executed, is configured to cause a mobile computing device to:
monitor a user's behavior based on interactions with a mobile computing device;
determine one or more user habits based upon the monitored user's behavior;
generate at least one triggering event associated with a respective determined user habit;
generate and pair an action based upon the respective determined user habit by creating and storing a triggering event and action pair such that the action is associated with a respective triggering event;
detect a triggering event, wherein the triggering event includes a predicted reduction in system resources of the mobile computing device and the predicted reduction in system resources includes a prediction of transitioning the mobile computing device to battery power;
in response to the triggering event, automatically perform the action paired with the triggering event using the stored triggering event and action pair, wherein the action includes retrieving anticipated data from a remote device before the predicted reduction in system resources occurs;
cache at least a portion of the anticipated data within a memory of the mobile computing device;
receive a request, from a user, for requested data, wherein the requested data includes at least the portion of the anticipated data; and
fulfill at least part of the request for the requested data by retrieving at least the portion of the anticipated data from the memory of the mobile computing device.

23. The computer program product of claim 22, wherein:
the triggering event includes a time of day; and
the action paired with the triggering event includes:
retrieving data from a plurality of news-related Internet sites, and
determining at least a first portion of the retrieved data to cache as the portion of the anticipated data and a second portion of the retrieved data to not cache as the portion of the anticipated data.

24. The computer program product of claim 22, wherein the executable code that, when executed, causes the mobile computing device to cache at least the portion of the anticipated data comprises executable code that, when executed, causes the mobile computing device to transmit at least the portion of the anticipated data that is cached to a remote server, wherein the remote server is configured to synchronize at least the portion of the anticipated data across a plurality of devices.

25. The computer program product of claim 22, wherein:
the triggering event includes an upcoming calendar appointment, wherein the upcoming calendar appointment is associated with a location; and
the action paired with the triggering event includes retrieving traveling directions from a first location to the location associated with the upcoming calendar appointment.

26. The computer program product of claim 22, wherein:
the triggering event includes an upcoming calendar appointment, wherein the upcoming calendar appointment is associated with one or more files; and
the action paired with the triggering event includes retrieving at least one of the one or more of the files associated with the upcoming calendar appointment.

27. The computer program product of claim 22, wherein:
the triggering event includes a change in location of the mobile device; and
the action includes retrieving at least the portion of the anticipated data based upon a new location of the mobile device.

28. The computer program product of claim 22, wherein:
the triggering event includes a first time of day; and
the executable code that, when executed, causes the mobile computing device to generate the triggering event associated with the respective determined user habit comprises executable code that, when executed, causes the mobile computing device to modify the triggering event to include a second time of day such that the action paired with triggering event consumes less system resources than if the action occurred at the first time of day.

29. The computer program product of claim 22, wherein the action includes one of trans-coding a video, synchronizing multimedia playlists, and performing a network action.

* * * * *